Patented June 17, 1941

2,246,226

UNITED STATES PATENT OFFICE 2,246,226

REFRACTORY

Samuel F. Walton, Hamburg, N. Y., assignor to The Exolon Company, Blasdell, N. Y., a corporation of Massachusetts No Drawing. Application September 23, 1936, Serial No. 102,246

7 Claims. (Cl. 106—64)

This invention relates to refractories, more particularly refractory concrete and has for its general object the production of a refractory concrete or other refractory of greater refractoriness and mechanical strength than the refractories now known in the art.

My refractory is a refractory of new and improved characteristic and the method by which I produce it involves a new concept and procedure.

My invention is based upon my discovery that an unexpected increase in the refractoriness and mechanical strength of the refractory may be obtained by the use of a novel refractory mix comprising a high-alumina hydraulic cement and a crystalline fused aluminum oxide which mix when heated to a ceramic temperature produces a ceramic bond which has a higher melting point than that of the hydraulic cement.

This increase in refractoriness of the bond is apparently due to the inter-action of the crystalline fused aluminum oxide with the high-alumina cement when the mix is heated, such increased refractoriness of the bond resulting in a corresponding increase in the refractoriness of the concrete or other refractory material.

Heretofore refractory concrete has been made by mixing a fire clay grog with a high-alumina hydraulic cement, usually in the proportions of one part by volume of hydraulic cement to four parts by volume of random size fire clay grog. The high-alumina hydraulic cement has a lower melting point than the fire clay grog and the refractory concrete made therefrom has a lower melting point (around 2600° F.) than the original fire clay grog.

The usual process in making refractory concrete from such a mixture is to wet the mixture with water, pour it into a mold, allow it to set for approximately twenty-four hours until it is firm and hard, and then to heat the formed ware to a ceramic temperature whereby to create a ceramic bond by the partial melting of the hydraulic cement and the inter-action between such ceramic bond and the surface of the grog particles.

Under the foregoing known procedure there is no development of a ceramic bond of increased refractoriness as is true with my invention by the reaction between the calcium aluminate of the cement and the fused aluminum oxide. Instead, the high-alumina cement alone is depended upon to furnish the bond, there being no equivalent for the fused aluminum oxide of my novel refractory mix.

In practicing my invention I first mix the high-alumina hydraulic cement and the crystalline fused aluminum oxide in the proper proportions. The mixture when used as a bond for refractory granules or grog is heated to a ceramic temperature to obtain the reaction between the calcium aluminate of the cement and the aluminum oxide and thus increase the refractoriness of the ceramic bond.

Such increase varies according to the proportions of the mix, but in any event results in a bond which has a higher melting point than the original hydraulic cement. For example, if the melting point of the cement itself is 2600° F., I can increase the refractoriness of the mix from 200° F. to 400° F. and this increase is carried over into the refractory concrete or other material. Thus the refractoriness of such concrete or other material will be from 2800° F. up to 3000° F. or over as compared with a refractoriness of only 2600° F. in concrete made by the present method.

My novel refractory mix may be as high as 50% by volume of hydraulic cement and 50% by volume of finely pulverized crystalline fused aluminum oxide. This mixture is ready for use as a bond and may be used with any of the well known refractory grogs such as fire clay grog (ground burned fire clay) crushed fire clay bricks of all kinds, fused alumina, fused magnesite, silicon carbide and the like. The amount of the mix to be used as a bond with the refractory grog varies with the type of grog and the run of mill size of the grog particles. A typical mix is as follows:

Four parts by volume of grog.
One and one-half parts by volume of my novel refractory mix.

This mix is made up wet enough to be readily worked in a mold, poured in the mold, and allowed to set for twenty-four hours, more or less, after which it is ready to be heated to a ceramic temperature to produce the reaction between the crystalline fused aluminum oxide and the calcium aluminate of the cement to form the ceramic bond of increased refractoriness which characterizes my invention.

I have used my novel refractory mix as a bond with fused aluminum oxide run of mill grains and mixtures of fused aluminum oxide run of mill grading and fire clay grog. I have also used it with fused magnesite run of mill grading and with silicon carbide run of mill grading. All of these materials have a higher melting point than fire clay grog and as a consequence my novel refractory mix or bond is unusually satisfactory when used with them, the melting point of the refractory concrete or other material produced being nearly as high as the melting point of the original refractory. With these refractory materials moreover the percentage of finely pulverized crystalline fused aluminum oxide in my novel refractory mix may be less than when fire clay grog is used, thus allowing a control of vitrification which is of considerable importance where strength of the refractory is a criterion.

Both the high-alumina hydraulic cement and the crystalline fused aluminum oxide which I use in my novel refractory mix are readily available in the open market and may be obtained in commercial quantities from any of several sources of supply.

I prefer to use a hydraulic cement which is in the calcium oxide alumina silica phase diagram, but which has a position in the high-alumina, high calcium area of such diagram. Such a cement is produced from bauxite combined with limestone and other calcareous materials, a convenient source of supply being the Atlas Lumnite Cement Company whose product "Lumnite" cement is well adapted for my purpose.

I have found that "Lumnite" cement or cement comparable thereto has an entirely different reaction from cement which in the phase diagram aforesaid has a position in the area which is high in silica, low in alumina and relatively high in lime.

Although I depend upon the calcium aluminate furnished by such cement as the bond for the grog I alter its action under heat by the addition of the fused aluminum oxide. This is added in finely pulverized form, being preferably of substantially the same particle size as the calcium aluminate and its importance in the mix in increasing the refractoriness of the bond is evidenced by the fact that when "Lumnite" cement alone is used with a fire clay grog, without addition of fused aluminum oxide, the melting point of the refractory concrete remains at approximately 2600° F., whereas with my novel refractory mix its refractoriness is increased to from 2800° F. to 3000° F. or over.

The aluminum oxide does not interfere with the cementing action of the hydrated calcium aluminate, but actually seems to aid such action.

I am aware that it has been proposed to use chrome oxide as a grog with calcium aluminate cement and that it has been used as a bond with other refractory articles, such as aluminum oxide. I am also aware that refractory mixes consisting of non-porous aluminous mixtures, plastic clay and grog are also known.

Thus, grog or granules of refractory oxides or refractory silicates, for use with calcium aluminate cement, have long been known.

So far as I am aware, however, no one prior to my invention or discovery has ever used as a bond for either chrome oxide, aluminum oxide, or any of the other refractory oxides or the aluminum silicates, a bond mixture composed of a calcium aluminate cement and fused aluminum oxide pulverized to a similar particle size as the cement whereby to substantially increase the refractoriness of the concrete or other refractory article. When my bond mixture is heated to ordinary ceramic temperatures, I obtain a reaction between the calcium aluminate of the cement and the aluminum oxide which produces a ceramic bond of greater refractoriness than the original cement.

The increase in refractoriness, of course, varies with the amount of fused aluminum oxide used. Similarly, the softening point of the mixture of cement and fused aluminum oxide will vary from 2600 F., which is the softening point of the cement without the fused aluminum oxide, up to approximately 3000° F. when 50% aluminum oxide is used with the cement. Any lower percentage than 50% of fused aluminum oxide will lower the refractoriness of the mix below 3000° F. This mix, used as a bond, is only part of the refractory concrete, and the softening point of the refractory concrete will depend on the refractoriness of the grog used with this mixture. As a matter of fact, with fire clay grog and the 50% fused aluminum oxide 50% calcium aluminate bond, I can obtain a softening point of over 3000° F. when the original softening point of such a refractory without the use of fused aluminum oxide is 2600° F. If I use fused aluminum oxide grog which has a softening point of over 3500° F., I can nearly approach this temperature of 3500° F. before reaching the softening point of the refractory concrete made from this fused alumina grog and the bond mix made of cement and finely divided fused aluminum oxide. In other words, if I take a fire clay grog with a softening point of approximately 3000° F. and use 4 parts of this grog and one part of the calcium aluminate cement, the resulting concrete will have a softening point of 2600° F. If, however, I take the same fire clay grog and add to 4 parts of this grog 1½ parts of my bond mix containing equal parts of fused aluminum oxide and calcium aluminate cement the resulting concrete has a softening point of approximately 3000° F.

From the foregoing it is evident that the use of my bond mix does not appreciably lower the softening point of the concrete below the softening point of the grog from which it is made. However, by decreasing the amount of fused aluminum oxide below 50% and by making a mix of calcium aluminate cement and fused aluminum oxide of, say, 70% calcium aluminate cement and 30% fused aluminum oxide, and using this mix as a bond in a proportion of 4 parts by volume of fire clay grog and 1½ parts by volume of the mix, I obtain a melting point of approximately 2800° F. The smaller the amount of fused aluminum oxide used in the bond, the lower the softening point of the concrete will be.

Various departures in materials, proportions, and procedural steps may be resorted to within the spirit and scope of my invention as defined by the appended claims.

What I therefore claim and desire to secure by Letters Patent is:

1. A batch mixture for forming refractory bodies comprising a refractory grog and a bonding mix for bonding the same, said mix comprising a high alumina hydraulic cement and a crystalline fused aluminum oxide towards which the cement is reactive at ordinary ceramic temperatures to form a refractory bond having a higher melting point than the hydraulic cement, the proportions of the bonding mix being approximately 50% cement and 50% aluminum oxide.

2. The batch of claim 1, the proportions being approximately four parts by volume of grog to one and one-half parts by volume of bonding mix.